United States Patent [19]

Downs et al.

[11] Patent Number: 4,654,011
[45] Date of Patent: Mar. 31, 1987

[54] FLOWER GARDEN

[76] Inventors: Arthur R. Downs; Theresa L. Downs, both of 1509 Hodges Ferry Rd., Portsmouth, Va. 23701

[21] Appl. No.: 831,403

[22] Filed: Feb. 20, 1986

[51] Int. Cl.$^4$ ............................................. G09B 23/38
[52] U.S. Cl. .................................... 434/276; 446/491
[58] Field of Search ...................... 434/276, 295, 433; 446/310, 311, 312, 314, 315, 489, 491

[56] References Cited

U.S. PATENT DOCUMENTS 496,257  4/1893  Gibson ................................ 434/276

Primary Examiner—William H. Grieb

[57] ABSTRACT

Flower and leaf like objects are elevated by mechanical means from open ended tubes that are arranged within a non-transparent enclosure such that the non-transparent enclosure is a base to a transparent enclosure into which the flower and leaf like objects are elevated into view. More, particularly, the flower and leaf like objects are elevated by mechanical means from tubes that are arranged within a non-transparent base such that these tubes open into a transparent enclosure under a transparent cover that is attached to the non-transparent base such that when the flower and leaf like objects are elevated by mechanical means the flower and leaf like objects become visible within the transparent enclosure. Further, the observation of the upward motion of flower and leaf like objects can be repeated as the flower and leaf like objects can be mechanically lowered from view and the flower and leaf like objects can by mechanical means be elevated back into view.

1 Claim, 2 Drawing Figures

FLOWER GARDEN

This invention relates to educational and amusement devices which provide for the observation of the upward motion of flower and leaf like objects as a consequence of the elevation of these flower and leaf like objects from tubes arranged within a non-transparent enclosure such that the non-transparent enclosure is a base to a transparent enclosure into which the flower and leaf like objects are elevated into view within the transparent enclosure. More particularly, the invention relates to amusement devices in which flower and leaf like objects are elevated by mechanical means from tubes that are arranged within a non-transparent base such that these tubes open into a transparent enclosure over the non-transparent base such that when the flower and leaf like objects are elevated by mechanical means the flower and leaf like objects become visible within the transparent enclosure. Further, the observation of the upward motion of flower and leaf like objects can be repeated as the flower and leaf like objects can be mechanically lowered from view by means that lowering the flower and leaf like objects by mechanical means into the tubes within the non-transparent base will result in the flower and leaf like objects being no longer visible within the transparent enclosure. The flower and leaf like objects can again be mechanically elevated from the tubes arranged within the non-transparent base such that when the flower and leaf like objects are mechanically elevated from the tubes the flower and leaf like objects become visible within the transparent enclosure. This mechanical lowering of the flower and leaf like objects out of view and the mechanical elevating of the flower and leaf like objects into view can be repeated as many times as the flower and leaf like objects are mechanically lowered out of view within the non-transparent base and mechanically elevated into view within the transparent enclosure.

SUMMARY OF THE INVENTION

It is an object of the present invention to provide a transparent cover over a non-transparent base so as to form a transparent enclosure over the non-transparent base in which enclosed within the non-transparent base are tubes that open into the transparent enclosure such that flower and leaf like objects within the tubes can be mechanically elevated from the tubes into view within the transparent enclosure.

It is another object of the present invention to provide a device of the character described with a top and bottom surface to the non-transparent base such that the top and bottom surfaces are attached to the non-transparent base with the top surface of the non-transparent base having openings which allow access from the non-transparent base to the transparent enclosure.

It is another object of the present invention to provide a device of the character described with a first rod enclosed within and supported by the non-transparent base such that one end of the first rod extends through the non-transparent base and attachs to a handle outside the non-transparent base such that turning the handle will result in the turning of the first rod within the non-transparent base by means of the first rod being attached to the handle.

It is another object of the present invention to provide a device of the character described in which cog wheels are attached to the first rod such that the cog wheels and the first rod turn together within the non-transparent base when the handle outside the non-transparent base is turned.

It is another object of the present invention to provide a device of the character described such that the teeth on the rim of the cog wheels that are attached to the first rod are adjusted to fit the notches in receiving bars that are attached to a second rod such that when the handle outside the non-transparent base is turned the first rod turns by means of the first rod being attached to the handle and that the cog wheels turn by means of their being attached to the first rod and that the teeth on the rim of the cog wheels engage the notches on the bars that are attached to the second rod and allow the elevating and lowering of the second rod.

It is another object of the present invention to provide a device of the character described such that the second rod is restrainted in lateral movement by pins extending through the second rod and such that these pins are secured at their ends to the top and bottom surfaces of the non-transparent base such that the second rod only has movement by being elevated and lowered along the lenght of these pins and that when not being elevated or lowered the second rod is held in place by the pins and supported by the bars attached to the second rod by means of the notches on the bars being fitted around the teeth on the rim of the cog wheels that are attached to the first rod that is supported by the base.

It is another object of the present invention to provide a device of the character described such that the second rod has columns attached along its lenght such that when the second rod is elevated or lowered the columns are elevated or lowered by means of these columns being attached to the second rod.

It is another object of the present invention to provide a device of the character described such that the columns that are attached along the length of the second rod have flower and leaf like objects attached at the top of the columns such that the flower and leaf like objects are elevated and lowered when the columns attached along the lenght of the second rod are elevated and lowered.

It is another object of the present invention to provide a device of the character described such that suspended from the top surface of the non-transparent base are tubes that are suspended by means of their being attached to the top surface of the non-transparent base and these tubes being aligned with the openings in the top surface of the non-transparent base such that there is access from the non-transparent base to the transparent enclosure by means of the tubes having both ends open which allows access from the non-transparent base to the transparent enclosure by means of the open ended tubes.

It is another object of the present invention to provide a device of the character described in which the flower and leaf like objects that are attached at the top of the columns are confined within the open ended tubes that are suspended from the top surface of the non-transparent base by means of these tubes being attached to the top surface of the non-transparent surface and as a consequence of this suspension from the top surface of the non-transparent base are hidden from view within the non-transparent base and that the tubes are aligned over the flower and leaf like objects and the tubes are also aligned over the columns upon which the flower and leaf like objects are attached at the top of the columns such that the open ended tubes confine the flower and leaf like objects in lateral movement but allow the flower and leaf like objects to be elevated out of these open ended tubes by means of turning the handle that is located outside of the non-transparent base and results in the flower and leaf like objects being mechanically elevated out of the open ended tubes through the openings that are in the top surface of the non-transparent base such that the flower and leaf like objects are elevated into view within the transparent enclosure by means of turning the handle outside of the non-transparent base which turns the first rod by means of the first rod being attached to the handle which results in the turning of the cog wheels that are attached to the first rod which results in the bars that are attached to the second rod elevating the second rod by means of the teeth on the rim of the cog wheels engaging the notches on the bars that are attached to the second rod which results in elevating the second rod which becomes elevated along the length of the pins that are attached at the bottom surface and the top surface of the non-transparent base and extend through the second rod and that as a consequence of the second rod being elevated the columns that are attached along the length of the second rod are elevated and as a consequence the flower and leaf like objects that are attached at the top of the columns are elevated out of the open ended tubes and out of the holes in the top surface of the non-transparent base and into view within the transparent enclosure.

It is another object of the present invention to provide a device of the character described such that a nameplate can be attached to the non-transparent base.

It is another object of the present invention to provide a device of the character described that is a safe and clean toy.

It is another object of the present invention to provide a device of the character described which is an educational device.

Further objects and advantages of my invention will become apparent from a consideration of the drawings and ensuing description thereof.

DESCRIPTION OF THE PREFERRED EMBODIMENT

Figure 1:
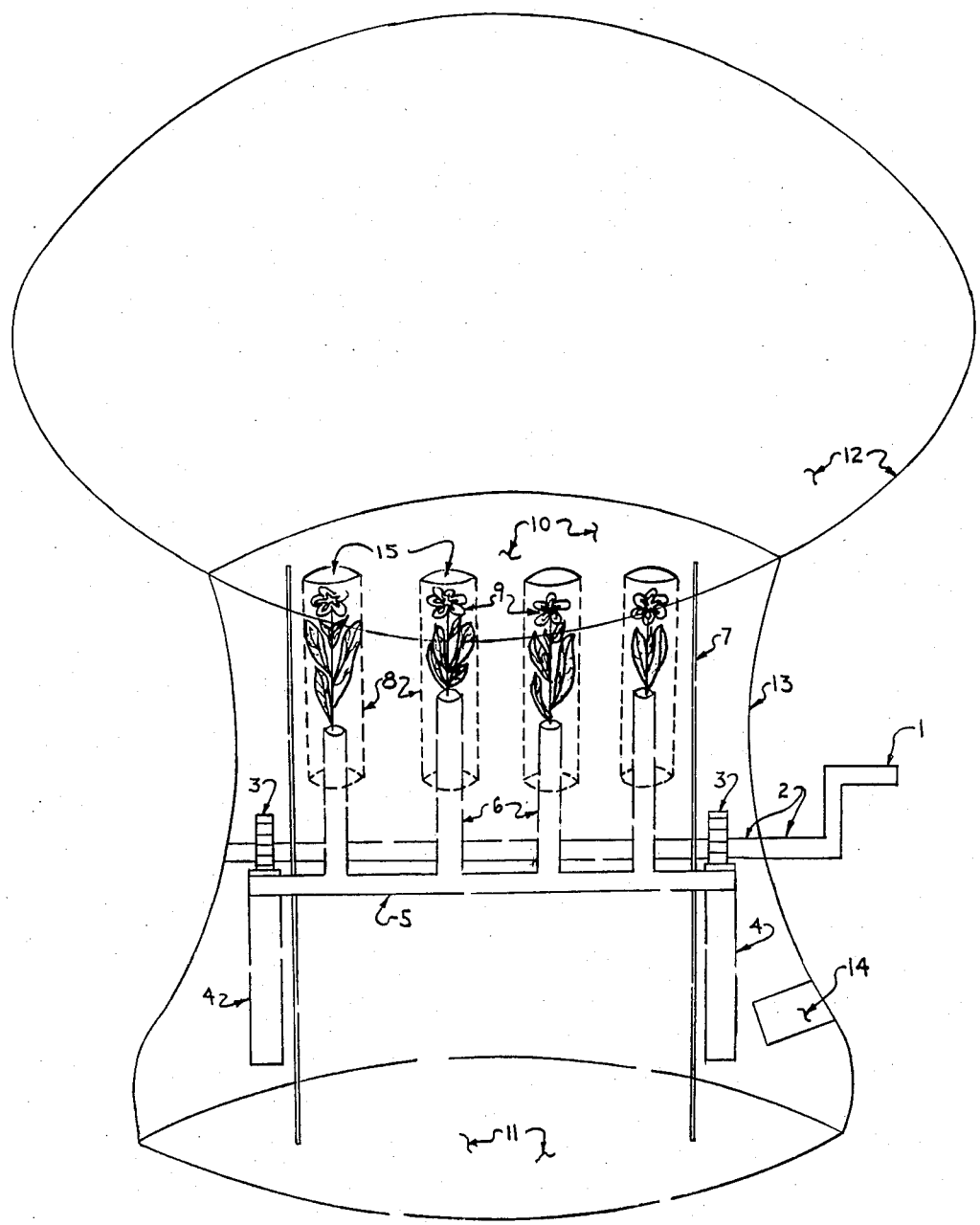
FIG. 1 is an elevation view of the present invention.
Figure 2:
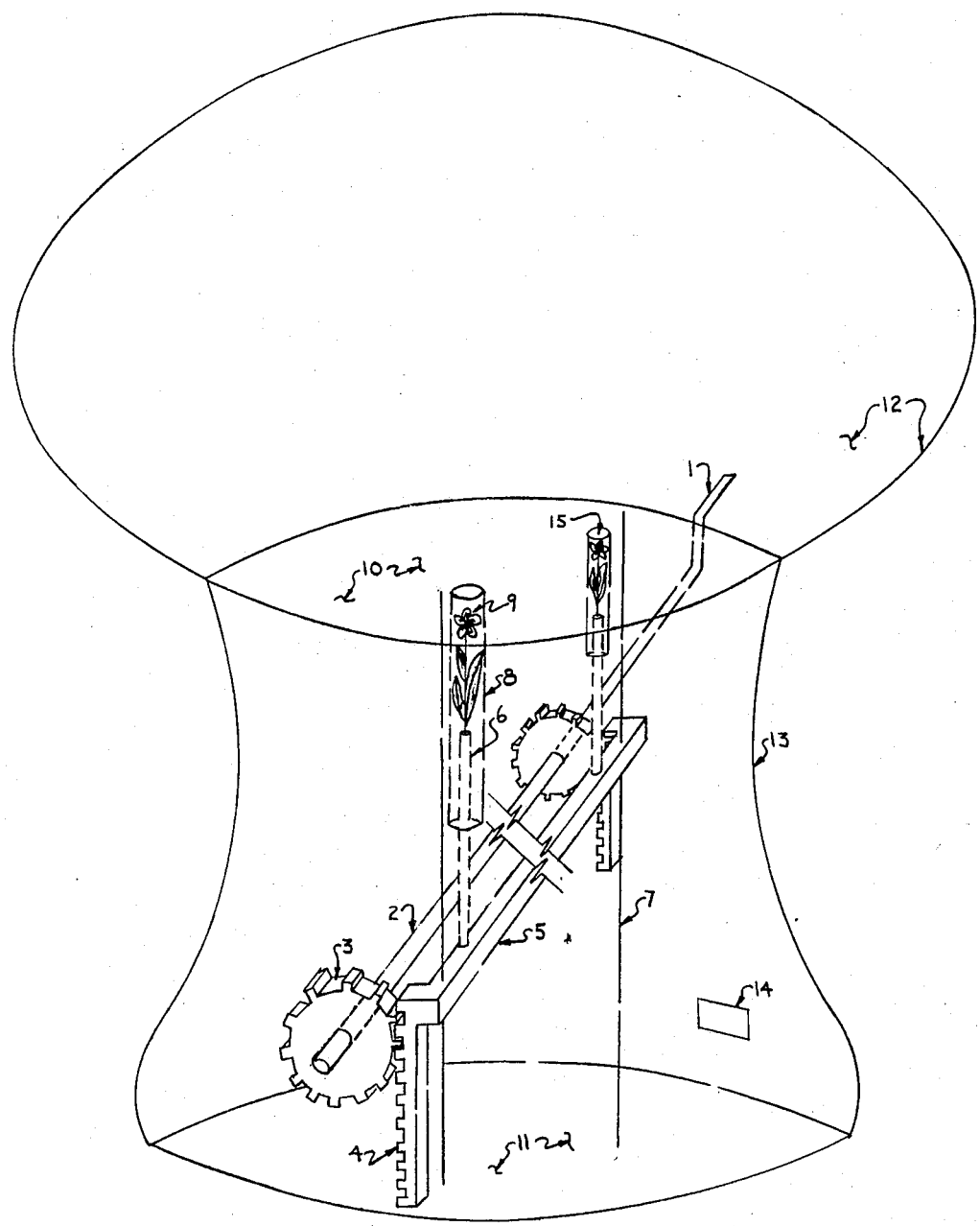
FIG. 2 is a perspective view of the present invention.

As shown in the drawings, in the preferred embodiment of the invention a transparent cover (12) is located over a non-transparent base (13) which encloses flower and leaf like objects (9) arranged within open ended tubes (8).

A top surface (10) and bottom surface (11) are attached to the non-transparent base (13) with the top surface (10) having openings (15).

A first rod (2) is enclosed and supported by the non-transparent base (13) with one end of the first rod (2) extending through the non-transparent base (13) and attaching to handle (1).

Cog wheels (3) are attached to the first rod (2) with the cog wheels (3) adjusted to fit notched bars (4) which are attached to second rod (5).

Columns (6) are attached along second rod (5) with pins (7) extending through second rod (5) with pins (7) attaching to top surface (10) and bottom surface (11).

Flower and leaf like objects (9) are attached to the top of columns (6) with flower and leaf like objects (9) surrounded by open ended tubes (8) with open ended tubes (8) attached to top surface (10) and aligned with holes (15).

A nameplate (14) can be attached to the non-transparent base. In the present invention the handle (1) can be turned by children whose interest may be attracted by the upward motion of flower and leaf like objects (9). Specifically, by turning the handle (1) the flower and leaf like objects (9) are elevated from open ended tubes (8) within a non-transparent base (13) such that when elevated from the open ended tubes (8) the flower and leaf like objects (9) become visible under transparent cover (12). By turning the handle (1) in the opposite direction the flower and leaf like objects (9) can be lowered into the open ended tubes (8) within the non-transparent base (13) and as a consequence be out of view. The elevation of the flower and leaf like objects (9) from out of the open ended tubes (8) within the non-transparent base (13) and into view under the transparent cover (12) can be accomplished again by turning the handle (1). This elevation of flower and leaf like objects (9) is educational as it provides for observing the upward motion of flowers and their leaves.

The embodiment that is described by this invention as shown in the drawings is intended for illustration and does not limit modifications to these drawings that do not depart from the spirit of the invention. Accordingly, the scope of the invention should be determined not by the embodiment illustrated, but by the appended claims and their legal equivalents.

We claim:
1. An amusement device comprising
   a transparent cover;
   a non-transparent base;
   a top surface;
   a bottom surface;
   a handle;
   a first rod;
   cog wheels;
   a second rod;
   notched bars;
   columns;
   flower and leaf like objects;
   open ended tubes;
   a nameplate;
   said transparent cover being positioned over and attached to said non-transparent base and said top surface being attached to the top of said non-transparent base and said bottom surface being attached to the bottom of said non-transparent base;
   said first rod being arranged within said non-transparent base and supported by said non-transparent base with one end of said first rod extending through said non-transparent base and attaching to said handle outside of said non-transparent base;
   said cog wheels being attached to said first rod and said cog wheels being aligned to fit said notched bars attached to said second rod positioned within said non-transparent base;
   said pins extending through said second rod and said pins attaching to said top surface and said bottom surface;
   said columns attached to said second rod and said flower and leaf like objects attached to top of said columns;
   said top surface has holes aligned with said open ended tubes attached to said top surface within said non-transparent base and said open ended tubes being aligned over said flower and leaf like objects and said flower and leaf like objects being aligned with holes in said top surface;
   said nameplate can be attached to said non-transparent base.

* * * * *